US009703559B2

(12) United States Patent
Igura

(10) Patent No.: US 9,703,559 B2
(45) Date of Patent: Jul. 11, 2017

(54) DIGITAL SIGNAL PROCESSOR, PROGRAM CONTROL METHOD, AND CONTROL PROGRAM

(71) Applicant: Hiroyuki Igura, Tokyo (JP)

(72) Inventor: Hiroyuki Igura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 467 days.

(21) Appl. No.: 14/356,816

(22) PCT Filed: Nov. 2, 2012

(86) PCT No.: PCT/JP2012/078418
§ 371 (c)(1),
(2) Date: May 7, 2014

(87) PCT Pub. No.: WO2013/069551
PCT Pub. Date: May 16, 2013

(65) Prior Publication Data
US 2014/0337606 A1    Nov. 13, 2014

(30) Foreign Application Priority Data

Nov. 9, 2011  (JP) ................. 2011-245769

(51) Int. Cl.
*G06F 9/30*  (2006.01)
*G06F 9/32*  (2006.01)

(52) U.S. Cl.
CPC ...... *G06F 9/30065* (2013.01); *G06F 9/30058* (2013.01); *G06F 9/321* (2013.01)

(58) Field of Classification Search
CPC ....................................... G06F 9/325
(Continued)

(56) References Cited

U.S. PATENT DOCUMENTS

| 5,056,004 A * | 10/1991 | Ohde ...................... G06F 9/325 712/241 |
| 6,401,196 B1 * | 6/2002 | Lee ......................... G06F 9/325 711/213 |
| 2009/0055635 A1 * | 2/2009 | Tani .................... G06F 9/30072 712/241 |

FOREIGN PATENT DOCUMENTS

JP   01-256033 A   10/1989
JP   2000-029700 A   1/2000
(Continued)

OTHER PUBLICATIONS

International Search Report of PCT/JP2012/078418 dated Feb. 5, 2013.
(Continued)

*Primary Examiner* — Andrew Caldwell
*Assistant Examiner* — Michael Metzger
(74) *Attorney, Agent, or Firm* — Sughrue Mion, PLLC

(57) ABSTRACT

When the branch condition of a branch command for a loop process is satisfied and enters the loop mode, the relative branch address is saved in a branch relative address save circuit that points to the branch command for loop processing, and the loop state flag is set in a loop state save circuit. When the loop state flag is set, if the absolute value of the value outputted by a command code counter circuit matches the absolute value of the relative branch address outputted by the branch relative address save circuit, a program counter sum value switching circuit outputs the relative branch address to an program counter adder. If the absolute values do not match, the program counter sum value switching circuit outputs the value '1' to the program counter adder. With this, the branch penalty during loop processing is eliminated even with little hardware.

6 Claims, 11 Drawing Sheets

(58) Field of Classification Search
USPC .......................................................... 712/241
See application file for complete search history.

(56) References Cited

FOREIGN PATENT DOCUMENTS

| | | |
|---|---|---|
| JP | 2002-259118 A | 9/2002 |
| JP | 2004-013255 A | 1/2004 |
| JP | 2004-030137 A | 1/2004 |
| JP | 2004-094824 A | 3/2004 |
| JP | 3656587 B2 | 6/2005 |
| JP | 2005-352755 A | 12/2005 |
| JP | 2006-502489 A | 1/2006 |
| JP | 3739357 B2 | 1/2006 |
| JP | 2008-165589 A | 7/2008 |
| JP | 2009-053861 A | 3/2009 |
| JP | 2011-086157 A | 4/2011 |
| WO | 2004/034252 A2 | 4/2004 |

OTHER PUBLICATIONS

Communication dated Dec. 13, 2016 from the Japanese Patent Office in counterpart application No. 2013-542948.

\* cited by examiner

DIGITAL SIGNAL PROCESSOR, PROGRAM CONTROL METHOD, AND CONTROL PROGRAM

CROSS REFERENCE TO RELATED APPLICATIONS

This is a National Stage of International Application No. PCT/JP2012/078418 filed Nov. 2, 2012, claiming priority based on Japanese Patent Application No. 2011-245769 filed Nov. 9, 2011, the contents of all of which are incorporated herein by reference in their entirety.

TECHNICAL FIELD

The present invention relates to a digital signal processor, a program control method, and a control program. More specifically, the present invention relates to a digital signal processor and the like for making it possible to reduce delay (overhead) in processing caused due to a branch penalty.

BACKGROUND ART

Demands for processing of video signals, audio signals, and the like by a digital signal processor (referred to as DSP hereinafter) is increasing nowadays in particular due to the fact that multimedia data such as videos and audios are handled more with computers, mobile terminals, digital audio equipment, or the like. Further, the volume of each data as the processing target is increased, and the content of each data processing is becoming sophisticated more and more. Furthermore, in order not to spoil the real-time property of the operations, it is required to execute such data processing in a short time.

Therefore, many of the recent DSPs are of such type which does not use exclusive-use hardware but uses an exclusive co-processor that is connected to a mounting co-processor core for executing such data processing.

Normally, a large number of processor cores are loaded to an exclusive LSI containing such DSP, so that the circuit scale of each processor core greatly influences the entire circuit scale. Reductions in the size of the device, the power consumption, the cost, and the like are required at all times, so that required is the DSP with which a sufficient processing capacity can be achieved for signal processing use while the circuit scale of each processor core is reduced as much as possible.

Normally, with the signal processing by the DSP, it is known that the time for executing loop processing in which a same command sequence is repeatedly performed occupies an extremely large proportion among the entire execution time. However, delay in the processing due to command invalidation of pipeline processing that is the so-called branch penalty exists in the branch command that is required when executing the pipeline processing. Thus, the branch penalty becomes greater as the number of loops is increased, which results in deteriorating the processing speed.

This will be described in more details. FIG. 7 is an explanatory chart showing the structure of a normal DSP 801. The DSP 801 is in a structure (the so-called Harvard architecture) in which a command memory (program memory) and a data memory are separated, which is constituted with a program control circuit 810, a computing unit 820, a register 830, and a data memory 840. The program control circuit 810 includes a command memory address generation circuit 811, a command memory 812, and a command decoder 813.

A command code stored at the corresponding address on the command memory 812 is read out and sent to the command decoder 813 according to the command address generated by the command memory address generation circuit 811. The command decoder 813 decodes the command code, and generates a control signal for controlling the computing unit 820 and the register 830. The computing unit 820 and the register 830 process the data stored in the data memory 840 with the control signal according to the command.

FIG. 8 is an explanatory chart showing the processing executed in the signal processing by the DSP 801 shown in FIG. 7. A command sequence 900 in which the commands to be processed by the DSP 801 are written is stored in the command memory 812. The command sequence 900 is constituted with individual commands 900a to 900s. Among those, the command 900n is the "loop processing branch command" in which a branch condition is written, and command the 900f is the "branch destination command" that is the returned command when the branch condition is satisfied.

The DSP 801 executes the command sequence 900 in order from the command 900a. In the command 900n that is the loop processing branch command, the DSP 801 judges whether or not the written branch condition is satisfied. When judged that it is unsatisfied, the following processing is shifted to the command 900o. When judged that it is satisfied, the processing is returned to the command 900f. That is, the DSP 801 repeatedly executes the processing of the commands 900f to 900m as long as the branch condition applies in the command 900n, and advances to the processing of the command 900o and thereafter when the condition becomes unsatisfied. In that sense, the commands 900f to 900n are generally referred to as the "loop command sequence".

FIG. 9 is an explanatory chart showing the more detailed structures of each of the commands 900a to 900s contained in the command sequence 900 shown in FIG. 8. Each of the commands 900a to 900s is processed in a four-stage pipeline of a command fetch (IF), a command decode (DE), an operation (OP), and a write back (WB). The DSP 801 which processes the command sequence 900 invalidates the two-cycles of commands following the command 900n that is the loop processing branch command, i.e., the commands 900o to 900p when the branch condition is satisfied. This is the branch penalty. Further, the DSP 801 returns to the command 900f after the branch penalty of the two cycles is generated, and continues the processing.

FIG. 10 is an explanatory chart showing the execution order of the command sequence 900 in a case where the branch penalty shown in FIG. 9 is generated in the DSP 801 shown in FIG. 7. As shown in FIG. 10, the state where the commands 900o to 900p are invalidated is repeated until the branch condition becomes unsatisfied. That is, delay of the processing caused by the branch penalty is increased as the number of loop times until the branch condition becomes unsatisfied is increased. In FIG. 10, the branch penalty section is expressed as "nop (no operation)".

There are followings as each of the technical documents related thereto. Patent Document 1 among those discloses a processor which prevents generation of the branch penalty by a method called branch prediction that will be described later. Patent Document 2 discloses a processor which prevents generation of the branch penalty by delay branch that will be described later. Patent Document 3 discloses a processor which prevents generation of the branch penalty by using "previously fetched address" and "to-be-fetched address".

Patent Document 4 discloses a processor which adds an inputted relative branch destination address to a program counter value, replaces it with an absolute branch destination address, and outputs the replaced branch command. Patent Document 5 discloses a processor which prevents generation of the branch penalty by using an executable condition that shows whether or not the branch command is to be executed.

Patent Document 6 also discloses a processor which prevents generation of the branch penalty by delay branch that will be described later as in the case of Patent Document 2. Patent Documents 7 and 8 disclose a processor which prevents generation of the branch penalty by a hardware loop that will be described later.

Patent Document 1: Japanese Unexamined Patent Publication 2002-259118
Patent Document 2: Japanese Unexamined Patent Publication 2004-013255
Patent Document 3: Japanese Unexamined Patent Publication 2004-030137
Patent Document 4: Japanese Unexamined Patent Publication 2008-165589
Patent Document 5: Japanese Unexamined Patent Publication 2009-053861
Patent Document 6: Japanese Unexamined Patent Publication Hei 01-256033
Patent Document 7: Japanese Patent No. 3656587
Patent Document 8: Japanese Patent No. 3739357

Various methods have been proposed for reducing the branch penalty in the DSP. Among those methods, each of the methods such as "delay branch", "hardware loop", and "branch prediction" will be described.

The delay branch is the method depicted in Patent Documents 2, 6, and the like described above. This method substantially reduces the branch penalty by executing an operation command that is to be performed within loop processing during a period called a delay slot that is between the execution of the branch command and the actual branching. However, with this method, the effect of reducing the branch penalty cannot be achieved in a case where the operation command cannot be allotted to the delay slot in a fine manner.

The hardware loop is the method depicted in Patent Documents 7, 8, and the like described above. This method performs loop branch processing and judging processing by means of hardware. In the processor depicted in Patent Documents 7 and 8, exclusive circuits for addresses of the start loop and the end loop and for counting the number of repeated executions of the loop processing are mounted thereby to achieve the loop processing by means of hardware.

FIG. 11 is an explanatory chart showing the structure of the command memory address generation circuit 811 of a case where the loop processing is performed by hardware loop in the DSP 801 shown in FIG. 7. The command memory address generation circuit 811 includes: a loop start address save circuit 811$a$ and a loop end address save circuit 811$b$, which save the front and end addresses of the loop processing, respectively. The command memory address generation circuit 811 further includes: a loop end detection circuit 811$c$ which detects whether or not it has reached the end of the loop processing; and a loop number counter circuit 811$d$ which counts the number of repeated executions of the loop processing.

Through employing such structure, the DSP 801 can perform the loop processing by means of hardware by comparing the program counter 811$e$ with the loop processing end address saved in the loop end address save circuit 811$b$ by using the loop end detection circuit 811$c$ and outputting the loop processing head address saved in the loop address save circuit 811$a$ to the program counter 811$e$ when the both match with each other. The loop number counter circuit 811$d$ counts the number of execution times of the loop processing, and advances to the following processing when it reaches the given number of times.

With this method, it is not necessary to allot the operation to the delay slot. Thus, the loop processing can be performed without generating the branch penalty at all times. However, the circuit scales of the loop start address save circuit 811$a$, the loop end address save circuit 811$b$, and the loop end detection circuit 811$c$, which are the exclusive circuits added for the loop processing, are relatively large, so that the circuit scale of the processor core is increased by mounting those.

For example, in a case where the address pulse width of the command memory is 32 bits, required is a register that is capable of storing 32-bit data for all of the loop start address save circuit 811$a$, the loop end address save circuit 811$b$, and the loop end detection circuit 811$c$. Further, calculations of 32-bit data are also required. As a result, the circuit scale is increased.

Further, with the hardware loop circuit provided with the loop number counter circuit 811$d$, the repeat number is a fixed number given in advance so that it is difficult to change the repeat number flexibly according to the state of the data being executed.

Branch prediction is the method depicted in Patent Document 1 and the like described above. This method saves the branch origin address and the branch destination address, and takes the address from which the next command code is read out as the branch destination address when the command address matches the branch origin address and it is predicted that the branch can be done. This method can be expected to achieve the effect of improving the processing performance further than the case of the above-described hardware loop in respect that it is possible to reduce the branch penalty not only for the loop processing but for various kinds of branching.

However, for performing the branch prediction, a branch prediction mechanism and a table for storing the branch origin address and the branch destination address are required. Thus, the circuit scale is increased further than the case of the hardware loop. Further, normally with the DSP, branching for the loop processing is executed mainly and branching for others is hardly executed. Therefore, it is considered that the effect corresponding to the increase in the circuit scale cannot be achieved, so that it is rare for the branch prediction mechanism to be employed for the actual DSP.

The techniques capable of overcoming the issues regarding the branch penalty in the DSP described above and the issues regarding each of the above-described methods are not depicted in the rest of Patent Documents 3 to 5, either.

The object of the present invention to provide a digital signal processor, a program control method, and a control program capable of reducing deterioration in the processing performance caused due to generation of the branch penalty in the loop processing while reducing the circuit scale.

DISCLOSURE OF THE INVENTION

In order to achieve the foregoing object, the digital signal processor according to the present invention is a digital signal processor which includes: a data memory which stores data as targets for executing processing; a computing unit which executes calculations on the data; a register which temporarily stores results of the calculations; and a program control circuit which generates a control signal that shows an action command for the computing unit, wherein: the program control circuit includes a command memory which stores command codes in which commands to be executed by the computing unit are written, a command decoder which sequentially reads out the command codes stored in the command memory and outputs those to the computing unit, and a command memory address generation circuit which generates a command memory address at which a command to be read out from the command memory is stored; the command decoder includes a circuit for switching branch command for loop processing, which outputs a branch relative address that shows an address of a loop processing branch command showing a branch condition of the loop processing on the command memory when the command codes are the loop processing in which a same command is sequentially repeated; and the command memory address generation circuit includes a program counter which outputs addresses on the command memory to the command decoder, a loop state save circuit which saves a loop state flag showing that the loop processing is being executed, a command memory address generation control circuit which sets the loop state flag to the loop state save circuit when the loop processing is being executed, a branch relative address save circuit which saves the branch relative address, a command code length counter circuit which counts a command code length that is a code length of one-time execution of the loop processing, and a program counter sum value switching circuit which outputs, to the program counter, a head address of the loop processing calculated by adding the command code length and the branch relative address when the branch condition is satisfied in the loop processing branch command.

In order to achieve the foregoing object, the program control method according to the present invention is used in a digital signal processor which includes: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit, wherein: a program counter outputs addresses on the command memory to the command decoder; a command decoder sequentially reads out the command codes stored at the outputted addresses on the command memory and outputs those to the computing unit; a circuit for switching branch command for loop processing outputs, to a branch relative address generation circuit, a branch relative address that shows an address of a loop processing branch command showing a branch condition of the loop processing on the command memory when the command codes are the loop processing in which a same command is sequentially repeated; a command memory address generation control circuit sets the loop state flag to the loop state save circuit when the loop processing is being executed; a command code length counter circuit counts a command code length that is a code length of one-time execution of the loop processing; and a program counter sum value switching circuit which outputs, to the program counter, a head address of the loop processing calculated by adding the command code length and the branch relative address when the branch condition is satisfied in the loop processing branch command.

In order to achieve the foregoing object, the control program according to the present invention is used in a digital signal processor which includes: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit. The program causes a computer that controls the digital signal processor to execute: a procedure for outputting addresses on the command memory to the command decoder; a procedure for sequentially reading out the command codes stored at the read out addresses on the command memory and outputting those to the computing unit; a procedure for outputting a branch relative address that shows an address of a loop processing branch command showing a branch condition of the loop processing on the command memory when the command codes are the loop processing in which a same command is sequentially repeated; a procedure for setting the loop state flag to the loop state save circuit when the loop processing is being executed; a procedure for counting a command code length that is a code length of one-time execution of the loop processing; and a procedure for outputting a head address of the loop processing calculated by adding the command code length and the branch relative address when the branch condition is satisfied in the loop processing branch command.

As described above, the present invention is structured to store the branch relative address and the command code length that is the code length for one-time execution of the loop processing and to output the first address of the loop processing by adding the branch relative address and the command code length when the branch condition is satisfied in the loop processing branch command. Therefore, it is possible to reduce generation of the branch penalty with a smaller circuit scale compared to the case of the hardware loop that stores the head and the end of the loop processing.

Thereby, it is possible to provide a digital signal processor, a program control method, and a control program exhibiting an excellent characteristic of being able to reduce deterioration in the processing performance caused due to generation of the branch penalty in the loop processing while reducing the circuit scale.

BEST MODES FOR CARRYING OUT THE INVENTION

Embodiments

Figure 1:
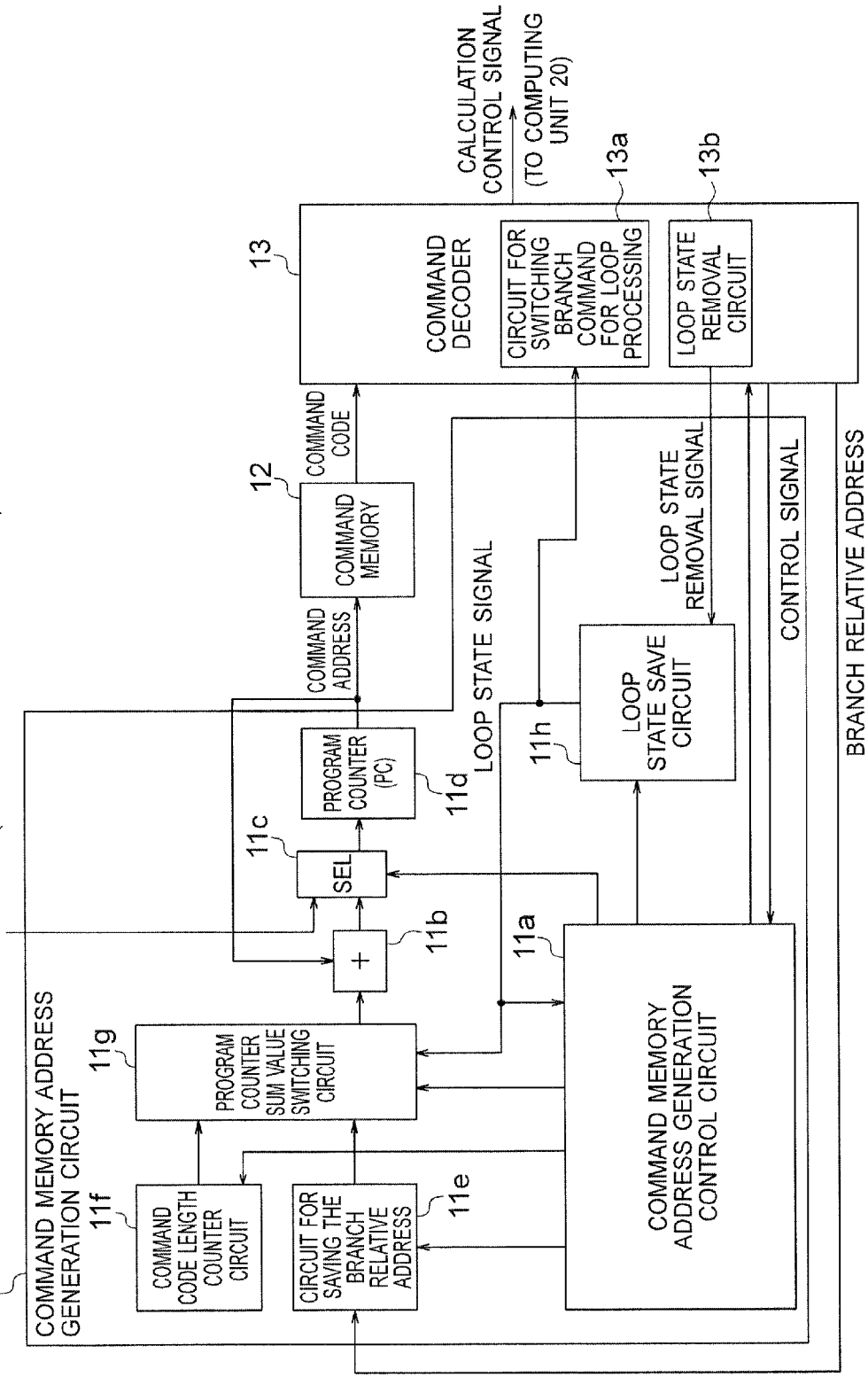
FIG. 1 is an explanatory chart showing the structure of a program control circuit shown in FIG. 2 in a more detailed manner.

Hereinafter, structures of embodiments of the present invention will be described by referring to the accompanying drawings FIGS. 1 to 3.

The basic contents of the embodiments will be described first, and the more specific contents will be described thereafter.

A digital signal processor (DSP) 1 according to the embodiment is a digital signal processor which includes: a data memory 40 which stores data to be the targets of processing; a computing unit 20 which executes calculations on the data; a register 30 which temporarily stores results of the calculations; and a program control circuit 10 which generates a control signal showing an action command for the computing unit. The program control circuit 10 includes: a command memory 12 which stores command codes in which commands to be executed by the computing unit are written; a command decoder 13 which sequentially reads out the command codes stored in the command memory and outputs those to the computing unit; and a command memory address generation circuit 11 which generates command memory addresses at which the commands to be read out from the command memory are stored. The decoder 13 includes a circuit 13a for switching branch command for loop processing, which outputs a branch relative address showing the address on the command memory regarding the loop processing branch command that shows the branch condition of the loop processing when the command code is the loop processing in which the same command is sequentially repeated. The command memory address generation circuit 11 includes: a program counter 11d which outputs an address on the command memory to the command decoder; a loop state save circuit 11h which saves a loop state flag showing that the loop processing is being executed; a command memory address generation control circuit 11a which sets the loop state flag to the loop state save circuit when the loop processing is being executed; a branch relative address save circuit 11e which saves the branch relative address; a command code length counter circuit 11f which counts the command code length that is the code length for one-time execution of the loop processing; and a program counter sum value switching circuit 11g which outputs, to the program counter, the first address of the loop processing calculated by adding the command code length and the branch relative address when the command condition is satisfied in the loop processing branch command.

Further, the command decoder 13 includes a loop state removal circuit 13b which releases the loop state flag of the loop state save circuit when the branch condition is satisfied in the loop processing branch command. Further, the range of the branch relative addresses saved in the branch relative address save circuit 11e is limited to be equal to or less than the address bus width of the command memory 12.

Furthermore, the command code length counter circuit 11f includes: a loop command sequence counter register 11i which stores numerical values of the periods where the loop state flag is being set; a subtractor 11j which subtracts the numerical values stored in the loop command sequence counter register by 1; and a comparator 11l which compares absolute values of the numerical values stored in the loop command sequence counter register and the branch relative address save circuit and, when the both match, outputs a signal showing that it has reached the last address of the loop processing to the command memory address generation control circuit.

By employing the above-described structures, the DSP 1 can reduce deterioration in the processing performance caused due to generation of the branch penalty in the loop processing while reducing the circuit scale.

This will be described in more details.

Figure 2:
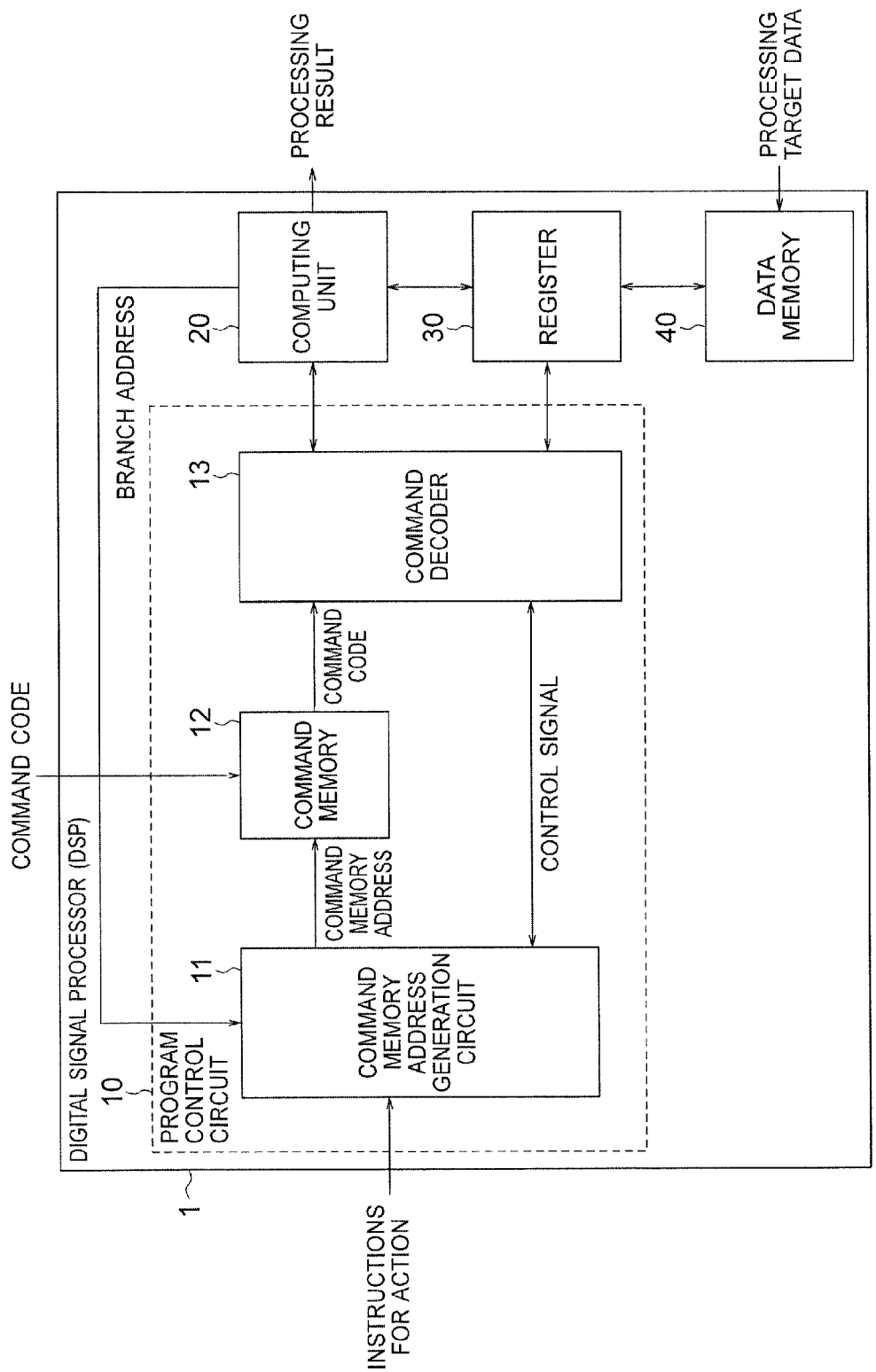
FIG. 2 is an explanatory chart showing the structure of a digital signal processor (DSP) according to a first embodiment of the present invention.
Figure 7:
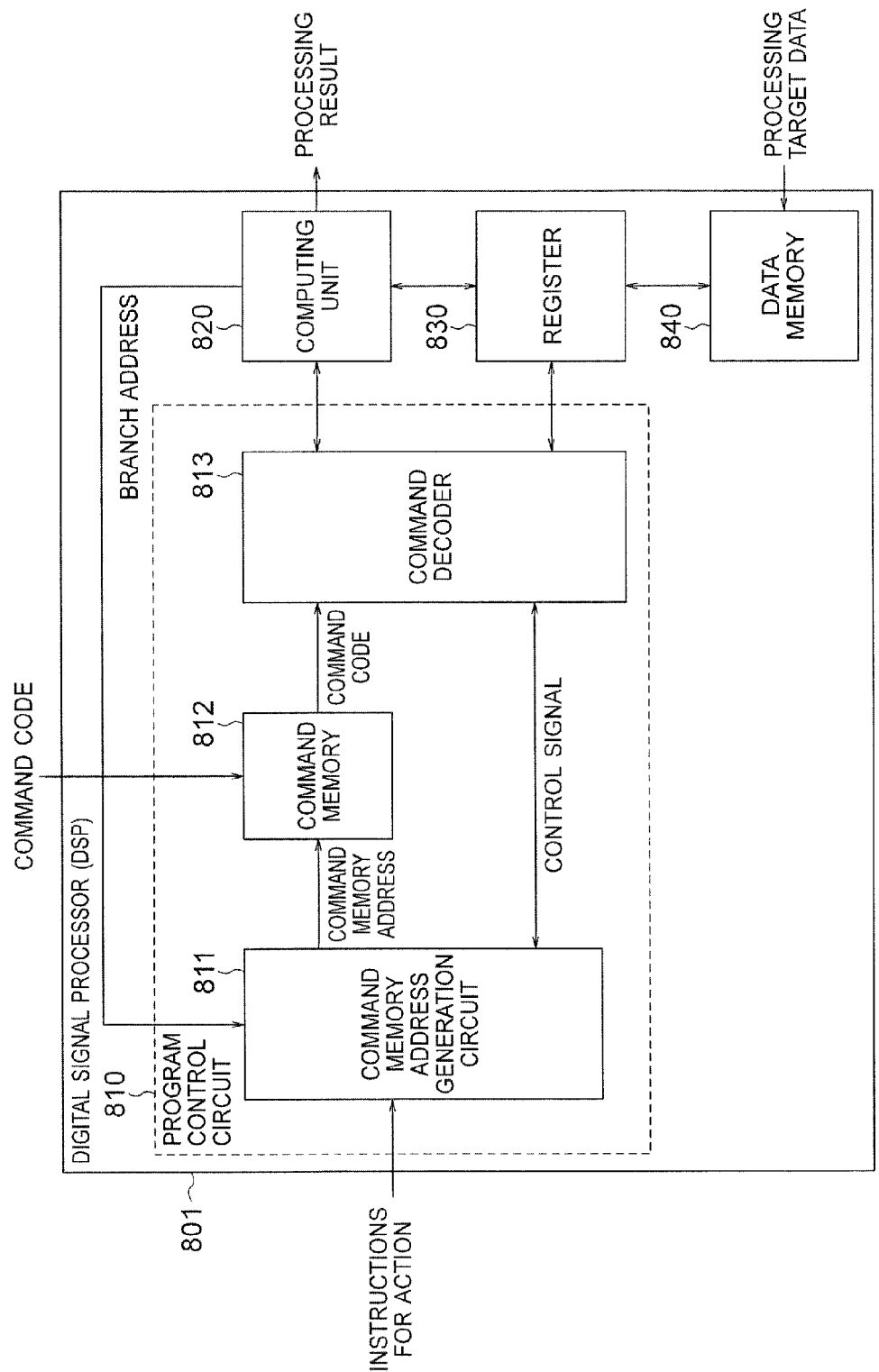
FIG. 7 is an explanatory chart showing the structure of a normal DSP.

FIG. 2 is an explanatory chart showing the structure of the digital signal processor (DSP) 1 according to the first embodiment of the present invention. The DSP 1 is in a structure (Harvard architecture) in which the command memory (program memory) and the data memory are separated as in the case of the normal DSP 801 shown in FIG. 7. The DSP 1 is constituted with: the program control circuit 10, the computing unit 20, the register 30, and the data memory 40. The program control circuit 10 includes the command memory address generation circuit 11, the command memory 12, and the command decoder 13.

According to the command memory address generated by the command memory address generation circuit 11, the command code stored at the corresponding address on the command memory 12 is read out and sent to the command decoder 13. The command decoder 13 decodes the command code, and generates control signals for controlling the computing unit 20 and the register 30. With the control signals, the computing unit 20 and the register 30 process the data stored in the data memory 40 according to the command. This structure described in FIG. 2 is the same as the structure of the normal DSP shown in FIG. 11.

FIG. 1 is an explanatory chart showing the structure of the program control circuit 10 shown in FIG. 2 in a more detailed manner. The command memory address generation circuit 11 of the program control circuit 10 includes: the command memory address generation control circuit 11a existing in the normal command memory address generation circuit; the program counter adder 11b; a program counter input selector 11c; and the program counter 11d.

In addition to those, the command memory address generation circuit 11 is provided with the branch relative address save circuit 11e, the command code length counter circuit 11f, the program counter sum value switching circuit 11g, and the loop state save circuit 11h, which are peculiar to the structures of the present invention. Further, the command decoder 13 is provided with the circuit 13a for switching the branch command for the loop processing and the loop state removal circuit 13b, which are peculiar to the structures of the present invention.

Actions of each of the above-described circuits will be described. When the command decoder 13 receives the loop processing branch command as a command code, the command decoder 13 informs the loop processing branch processing to the command memory address generation control circuit 11a and outputs the branch relative address as in the case of the normal branch command. Upon that, the command memory address generation control circuit 11a requests the branch relative address save circuit 11e to save the branch relative address, and the branch relative address save circuit 11e saves the branch relative address.

At the same time, the command memory address generation control circuit 11a informs the loop state save circuit 11h to set a flag indicating that it is in a loop state, and the loop state save circuit 11h sets the loop state flag in response to that. The command memory address generation control circuit 11a further requests the command code length counter circuit 11f to clear the counter, and the command code length counter circuit 11f clears the counter in response to that.

Further, at the same time, a branch address generated by the computing unit 20 is set in the program counter 11d, and the command code is read out from the head of the loop command sequence. In a state where the loop state flag is set in the loop state save circuit 11h, the command code length within the loop command sequence is counted by the command code length counter circuit 11f.

The program counter sum value switching circuit 11g compares the command code length of the loop command sequence counted by the command code length counter circuit 11f with the absolute value of the branch relative address saved in the branch relative address save circuit 11e. The program counter sum value switching circuit 11g outputs "1" to the program counter adder 11b when the both do not match with each other, and outputs the saved branch relative address when the both match with each other.

When "1" is outputted from the program counter sum value switching circuit 11g, the value of the program counter 11d is incremented (added) by 1. As a result, the command code within the loop command sequence is sequentially read out from the command memory 12.

In the meantime, when the value of the program counter 11d becomes the last command of the loop command sequence, i.e., the address for the loop processing branch command, the saved branch relative address is outputted from the program counter sum value switching circuit 11g. As a result, the output value of the adder 11b becomes the address value for the first command code of the loop command sequence. That address value is set to the program counter 11d, and the command code is read out again sequentially from the head of the loop command sequence.

When the branch processing is accomplished by the branch command in a state where the loop state flag is set in the loop state save circuit 11h, a loop state removal signal is generated by the loop state removal circuit 13b so that the loop state flag within the loop state save circuit 11h is cleared. Further, when the branch processing is accomplished by the branch command in a state where the loop state flag is set in the loop state save circuit 11h, the establishing condition of the loop processing branch command is inverted by the loop processing branch command switching circuit 13a so that the branch destination address is switched to the address of the next command of the loop processing branch address.

Figure 3:
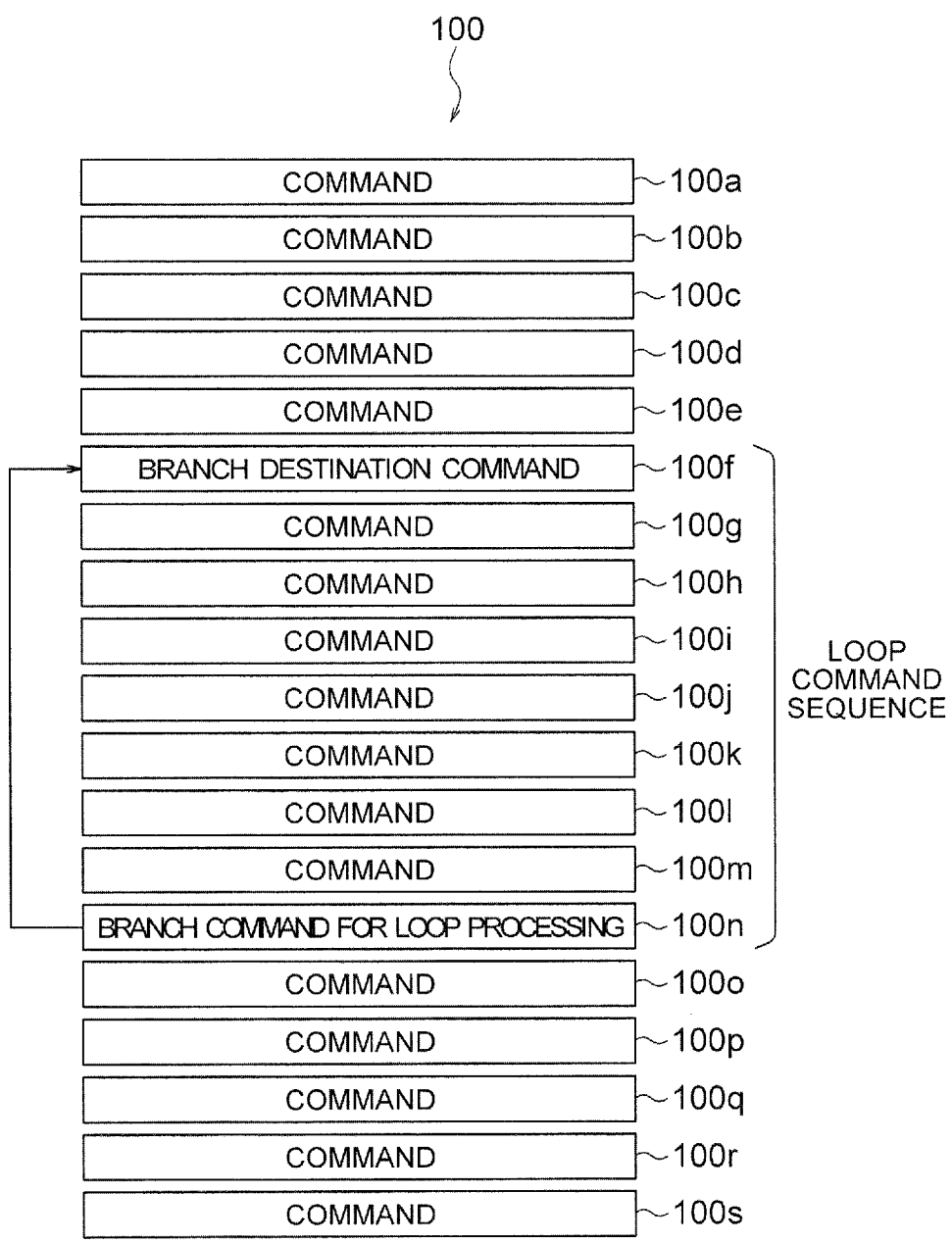
FIG. 3 is an explanatory chart showing the processing executed in signal processing by the DSP shown in FIGS. 1 to 2.
Figure 8:
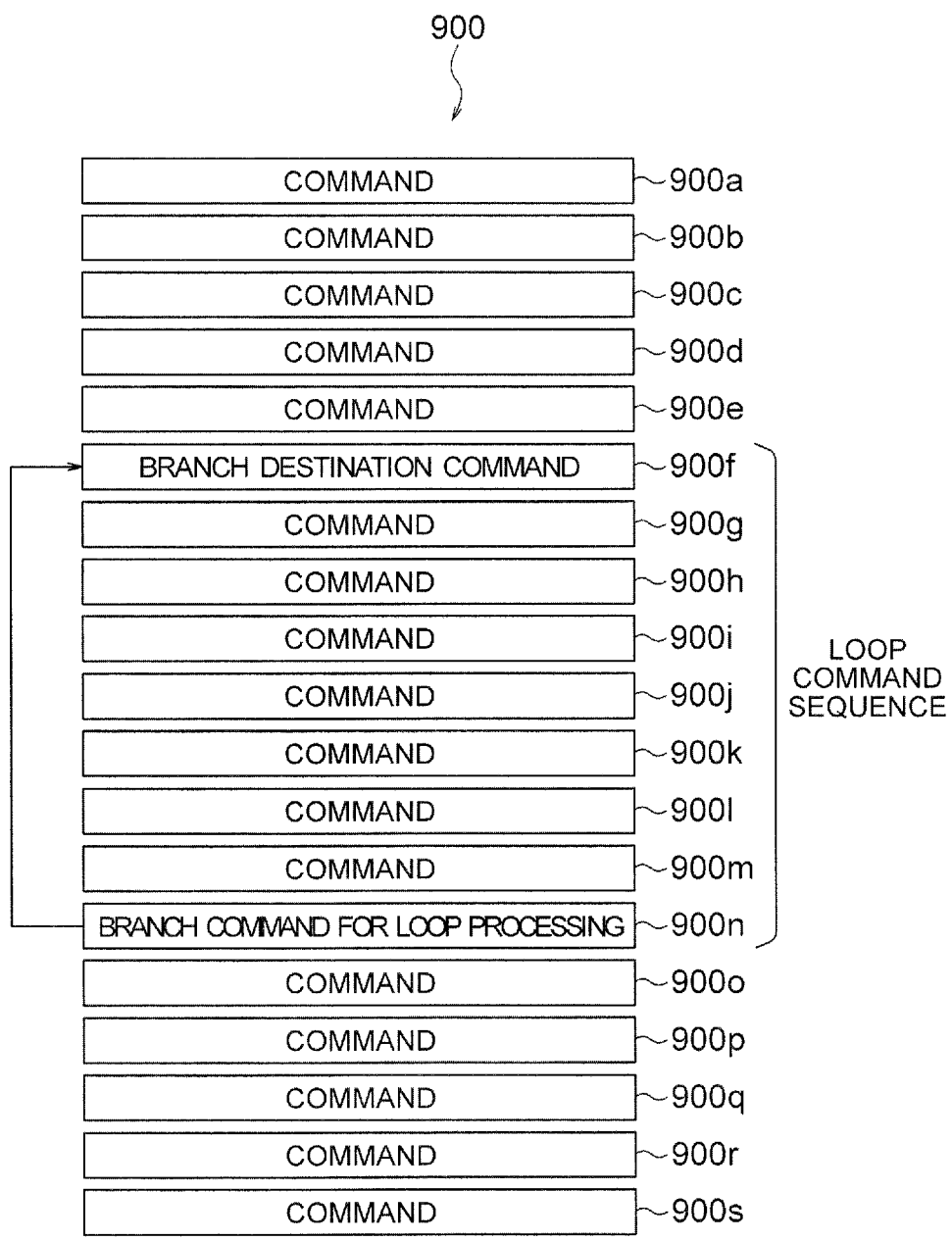
FIG. 8 is an explanatory chart showing the processing executed in the signal processing by the DSP shown in FIG. 7.

FIG. 3 is an explanatory chart showing the processing executed in the signal processing by the DSP 1 shown in FIGS. 1 to 2. A command sequence 100 in which the commands to be processed by the DSP 1 are written is stored in the command memory 12. The command sequence 100 is constituted with each of the commands 100a to 100s as in the case of the command sequence 900 shown in FIG. 8, and the command 100n among those is a "loop processing branch command".

With the command 100n, it is judged whether or not a given branch command is satisfied. When judged as unsatisfied, the processing is shifted to the following command 100o. When judged as satisfied, the processing is returned to the command 100f. That is, the DSP 1 repeats the processing of the commands 100f to 100m until the branch condition becomes unsatisfied. That is, the commands 100f to 100m are the "loop command sequence" in the command sequence 100, the command 100n is the "loop processing branch command", and the command 100f is the "branch destination command". In the initial state, the loop state flag is not set in the loop state save circuit 11h.

Figure 4:
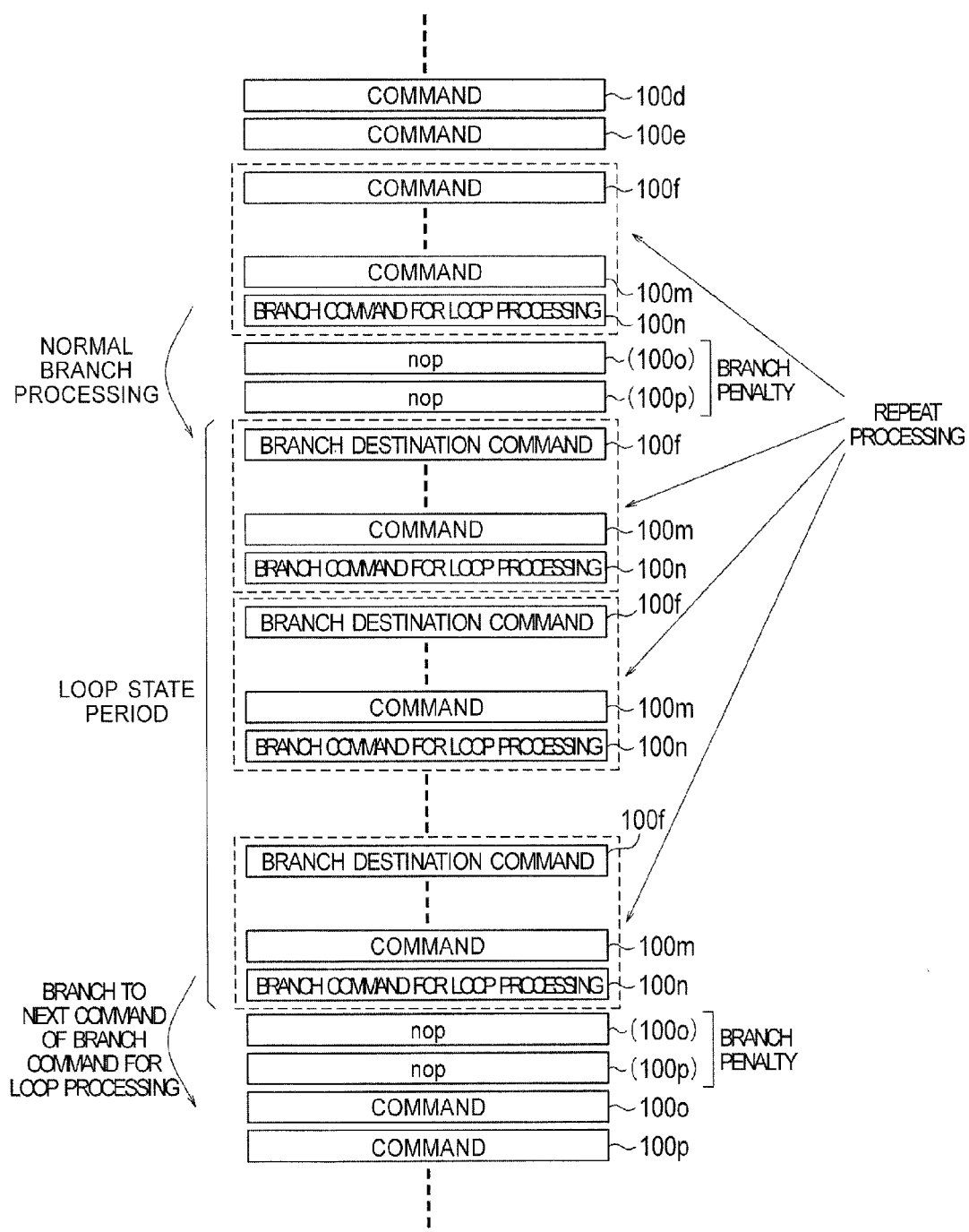
FIG. 4 is an explanatory chart showing the execution order of each command when a command sequence shown in FIG. 3 is executed by the DSP shown in FIGS. 1 to 2.
Figure 9:
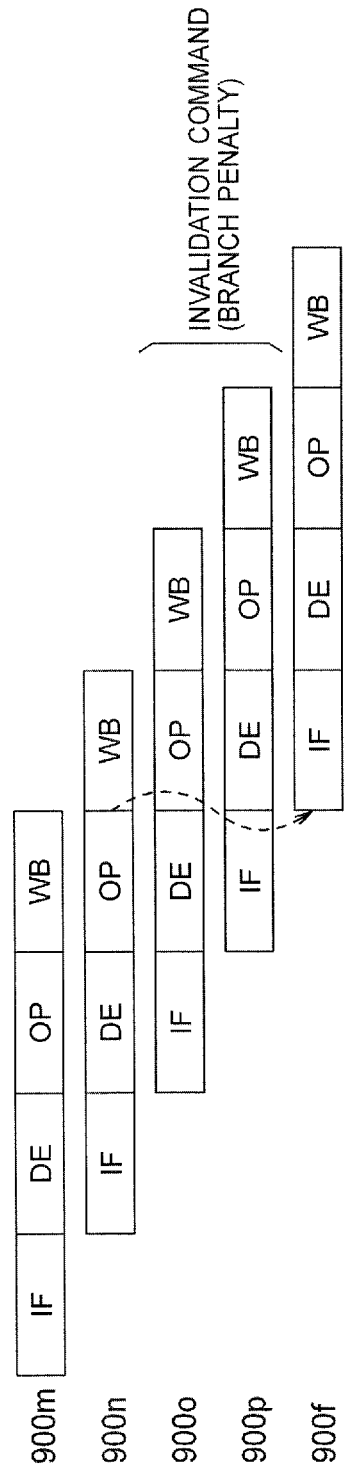
FIG. 9 is an explanatory chart showing a more detailed structure of each command contained in a command sequence shown in FIG. 8.
Figure 10:
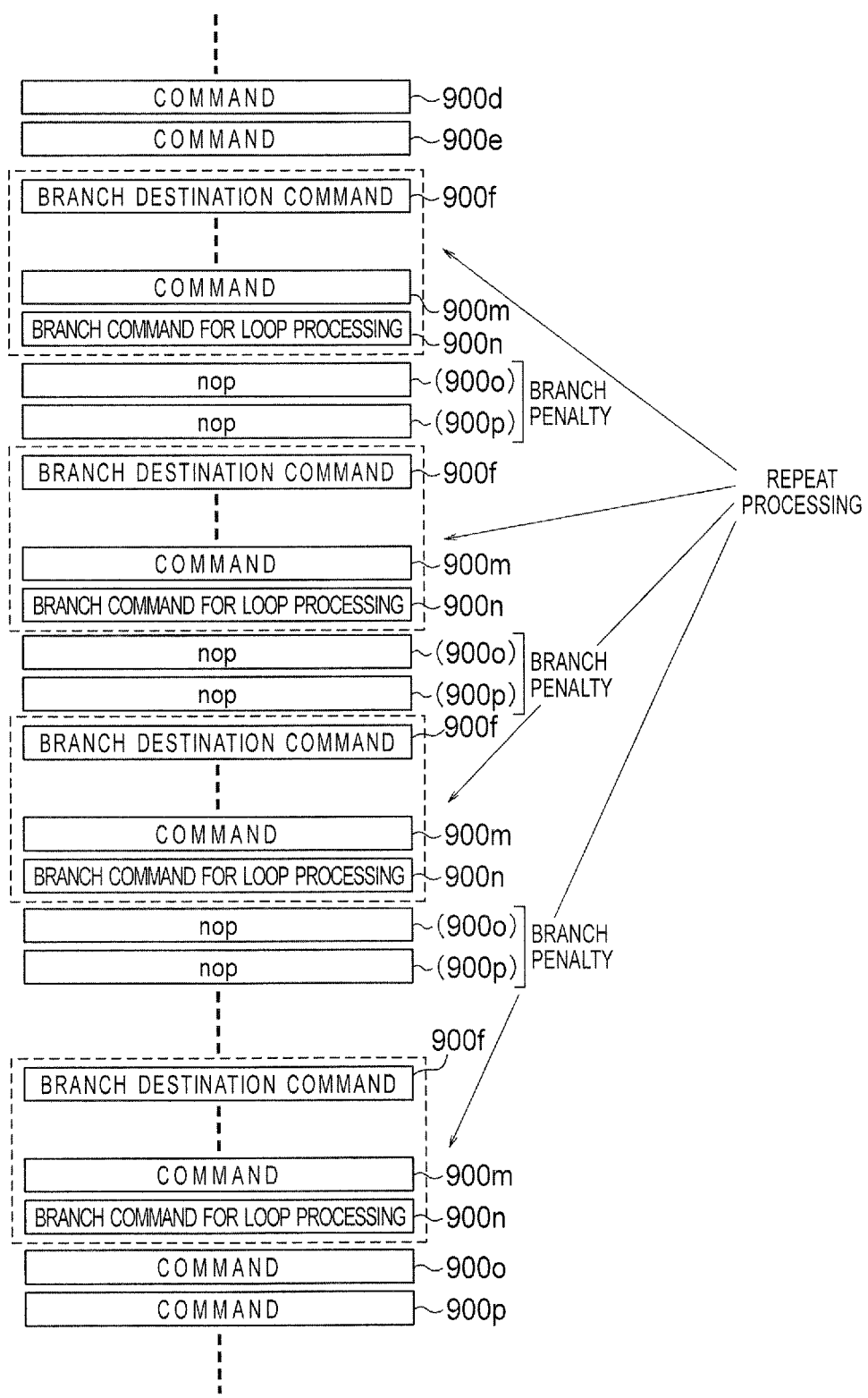
FIG. 10 is an explanatory chart showing the execution order of a command sequence when the branch penalty shown in FIG. 9 is generated in the DSP shown in FIG. 7.

FIG. 4 is an explanatory chart showing a case where the command sequence 100 shown in FIG. 3 is executed by the DSP 1 shown in FIGS. 1 to 2. Upon executing the command sequence 100 in order from the command 100a in this state and executing the command 100n that is the loop processing branch command, the DSP 1 sets the loop state flag in the loop state flag save circuit 11h, returns the processing to the command 100f that is the head of the loop command sequence as in the case of FIGS. 8 to 10, and invalidates the commands 100o to 100p for the two cycles following the command 100n to be the branch penalty.

Thereafter, the DSP 1 again executes the loop command from the command 100f sequentially, and reaches the command 100n that is the loop processing branch command again. At this point, the branch condition is still satisfied. However, the loop state flag is set in the loop state save circuit 11h. Thus, the saved branch relative address is outputted from the program counter sum value switching circuit 11g, the address value for the first command code of the loop command sequence is outputted from the adder 11b, and it is set to the program counter 11d.

That is, the branch penalty is not inserted after the command 100n, and the command code of the command 100f as the head of the loop command sequence is directly read out and executed sequentially. The DSP 1 repeats the above-described actions until the branch condition of the command 100n becomes unsatisfied.

When the branch condition becomes unsatisfied, the branch condition of the command 100n in the state where the loop state flag is set in the loop state save circuit 11h is inverted, the establishing condition of the loop processing branch command is inverted by the loop processing branch command switching circuit 13a so that the branch destination address is switched to the address of the next command of the loop processing branch command, i.e., the address of the command 100o. Thus, the commands 100o to 100p are invalidated to be the branch penalty, and then the command 100o and thereafter are executed.

However, in a case where the command sequence 100 is executed by the DSP 1, the branch penalty is inserted only in the first time and the last time among the repeated executions of the loop command sequence. Thus, it can be understood that deterioration in the processing performance by the branch penalty is reduced greatly. Especially, as the repeated number of the loop command sequence is increased, the effect of lightening the deterioration in the processing performance can be exhibited more prominently.

Figure 5:
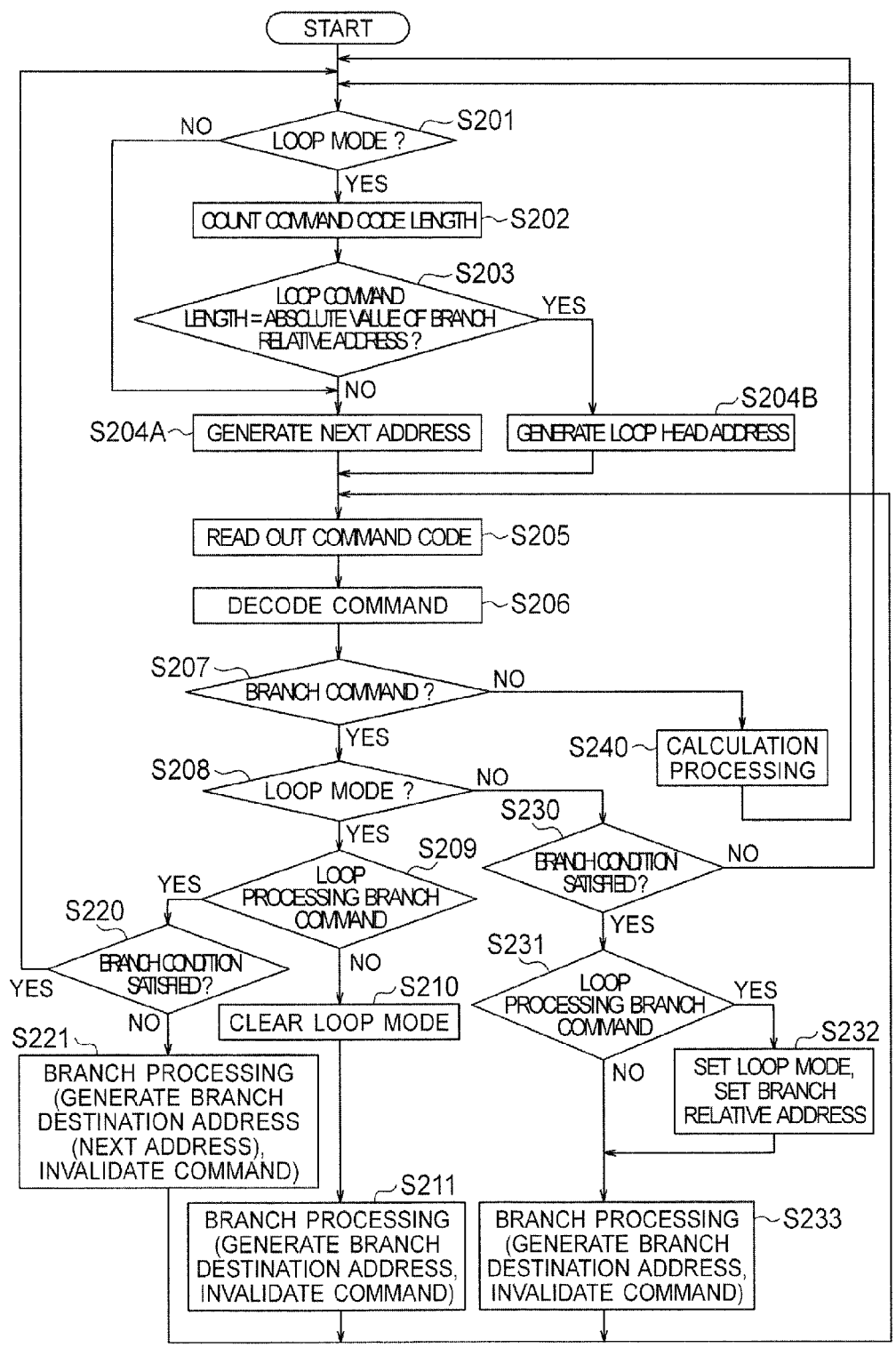
FIG. 5 is a flowchart showing the processing executed when the command sequence shown in FIG. 3 is executed by the DSP shown in FIGS. 1 to 2.

FIG. 5 is a flowchart showing the processing that is performed when executing the command sequence 100 shown in FIG. 3 by the DSP 1 shown in FIGS. 1 to 2. First, the user starts the program control circuit 10 while storing the program code in the command memory 12 and the data as the processing target in the data memory 40 in advance. Upon that, the command decoder 13 first judges whether or not the current processing is a loop mode (step S201), and the processing is advanced to step S204A to be described later when it is not a loop mode. Whether it is the loop mode or not is judged based on whether or not the loop state flag is set in the loop state save circuit 11h.

When the processing is judged as the loop mode in step S201, the command code length counter circuit 11f counts the command code length (step S202), and the command decoder 13 judges whether or not the code length of the loop command sequence matches the absolute value of the relative branch address (step S203) from the counted result. The program counter sum value switching circuit 11g and the adder 11b generate the address of the head of the loop processing by adding the command code length and the branch relative address (step S204A) when judged as matched, while simply generating the address of the command executed next (step S204B) when judged as unmatched. In both cases, the generated addresses are outputted to the program counter 11d.

Upon that, the program counter 11d outputs the address on the command memory 12 to the command decoder 13 (step S205). The command decoder 13 sequentially reads out the command codes stored at the outputted addresses on the command memory 12, and outputs those to the computing unit (step S206).

Then, the command decoder 13 judges whether or not it has reached the loop processing branch command (step S207). When judged as not reached, the computing unit 20 performs the calculation processing according to the command code (step S240), and the processing is returned to step S201 and thereafter. When judged in step S207 that it has reached the loop processing branch command, the command decoder 13 further and again judges whether or not the processing is a loop mode (step S208). When judged as the loop mode, the command decoder 13 further and again judges whether or not it is the loop processing branch command (step S209).

When judged in step S209 that it is not the loop processing branch command, the loop state removal circuit 13b of the command decoder 13 issues a loop state removal signal to the loop state save circuit 11h to remove the loop state flag (step S210), and then executes the processing for generating the branch destination address (step S211). Then, the processing is returned to step S205.

When judged in step S209 that it is the loop processing branch command, the command decoder 13 further judges whether or not the branch condition is satisfied (step S220). When the branch condition is satisfied, the processing is returned to step S201. When the branch condition is not satisfied in step S220, the branch destination address and the next address are generated and processing for generating the branch penalty is performed (step S221). Then, the processing is returned to step S205.

When judged in step S208 that it is not the loop mode, the command decoder 13 also judges whether or not the branch condition is satisfied in this case (step S230). When the branch condition is not satisfied, the processing is returned to step S201. When the branch condition is satisfied, the command decoder 13 further and again judges whether or not it is the loop processing branch command (step S231). When it is not the loop processing branch command, the processing is advanced to step S233 to be described later.

When judged in step S231 that it is the loop processing branch command, the command memory address generation control circuit 11a sets the loop state flag in the loop state save circuit 11h (step S232). Then, the processing for generating the branch destination address is executed (step S233), and the processing is returned to step S205.

(More Detailed Structures)

Figure 6:
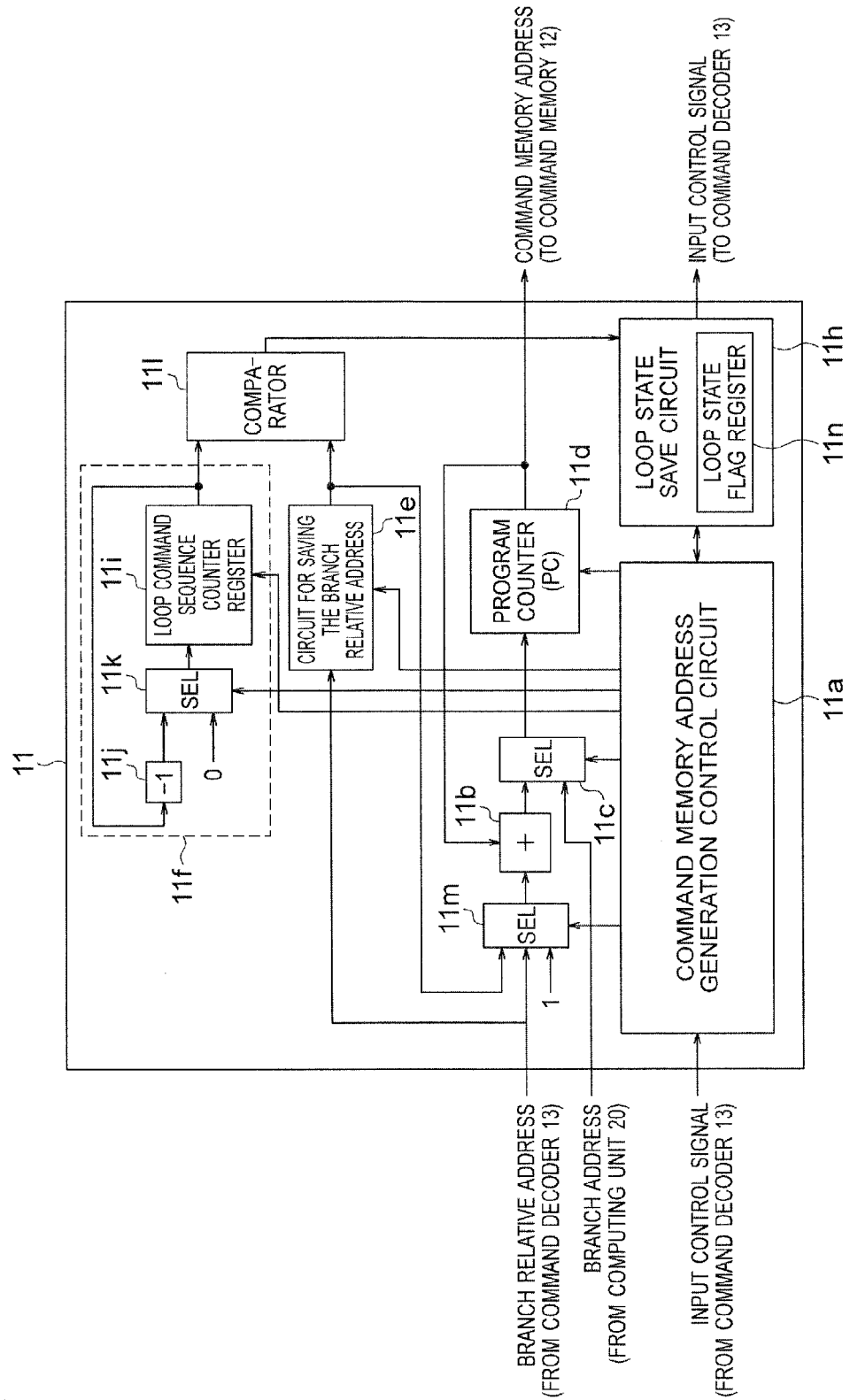
FIG. 6 is an explanatory chart showing the structure of a command memory address generation circuit shown in FIGS. 1 to 2 in more details.

FIG. 6 is an explanatory chart showing the structure of the command memory address generation circuit 11 shown in FIGS. 1 to 2 in a more detailed manner. The command code length counter circuit 11f in FIG. 1 is constituted with the loop command sequence count register 11i, the subtractor 11j, and a selector 11k. Further, the program counter sum value switching circuit 11g is constituted with the comparator 11l and a selector 11m. Furthermore, a loop state flag 11n is included in the loop state save circuit 11h.

First, when the branch processing is issued from the computing unit 20 by the loop processing branch command, the branch address is loaded to the program counter 11d via the program counter input selector 11c and the address of the head command of the loop command sequence is outputted to the command memory 12 as the command memory address.

At the same time, the command decoder 13 gives the value acquired by subtracting the address of the next command of the loop processing branch command from the address of the head of the loop command sequence as the branch relative address. This value becomes a minus value in the loop processing, so that two's complement is used. The branch relative address is saved in the branch relative address save circuit 11e. Further, at the same time, the command memory address generation control circuit 11a sets "0" to the loop command sequence count register 11i, and also sets the loop state flag 11n within the command memory address generation control circuit 11a.

During a period where the loop state flag 11n is being set, the value stored in the loop command sequence count register is decremented (subtracted) by 1 by the subtractor 11j. Thereby, the inverted value of the command number in the lop command sequence is counted. At the same time, the value of the program counter 11d is added by 1.

The inverted value of the command number counted by the loop command sequence counter register 11i and the branch relative address saved in the branch relative address save circuit 11e are compared by the comparator 11l. When the both match with each other, a signal indicating that it has reached the end of the command sequence is outputted to the command memory address generation control circuit 11a.

The command memory address generation control circuit 11a stores the result acquired by adding the value of the program counter 11d and the relative address stored in the branch relative address save circuit 11e to the program counter 11d again. Thereby, the processing can be returned to the address of the first command code (command 100f) of the loop command sequence in the command sequence 100 shown in FIG. 3. Further, when the branch processing by the branch command (command 100n) is generated while the loop state flag 11n is being set, the loop state flag 11n is cleared. Thus, the normal branch processing is performed.

Thereby, the DSP 1 including the command memory address generation circuit 11 can reduce the branch penalty as described in FIG. 3. Further, the bit width of the branch relative address can be made smaller than the bit width of the branch address. The reason for that is because the bit width of the branch relative address is the bit width of the branch relative address embedded in the command code of the loop processing branch command so that the bit width of the branch relative address of the loop processing branch command becomes smaller than the bit width of the branch address.

That is, through limiting the range of the branch relative addresses saved in the branch relative address save circuit 11e to a specific value or less, the bit width of the branch relative address can be reduced. In that case, when the branch relative address, i.e., the code number of the loop command sequence, is larger than a specific value, the loop processing can be executed by performing the normal branch processing. For example, in a case where the address bus width of the command memory is 32 bits, the branch relative address saved in the branch relative address save circuit 11e can be set as a smaller bit number such as 8 bits or 16 bits.

In this case, every time the DSP 1 executes the loop processing branch command, the branch penalty is added in the first time and the last time of the loop command sequence as described in FIG. 3. However, the number of cycles for executing the loop command sequence is extremely large as described above, so that the increase in the processing cycles by adding the branch penalty is small. Therefore, the adverse effect upon the processing capacity caused due to generation of the branch penalty is insignificant.

Figure 11:
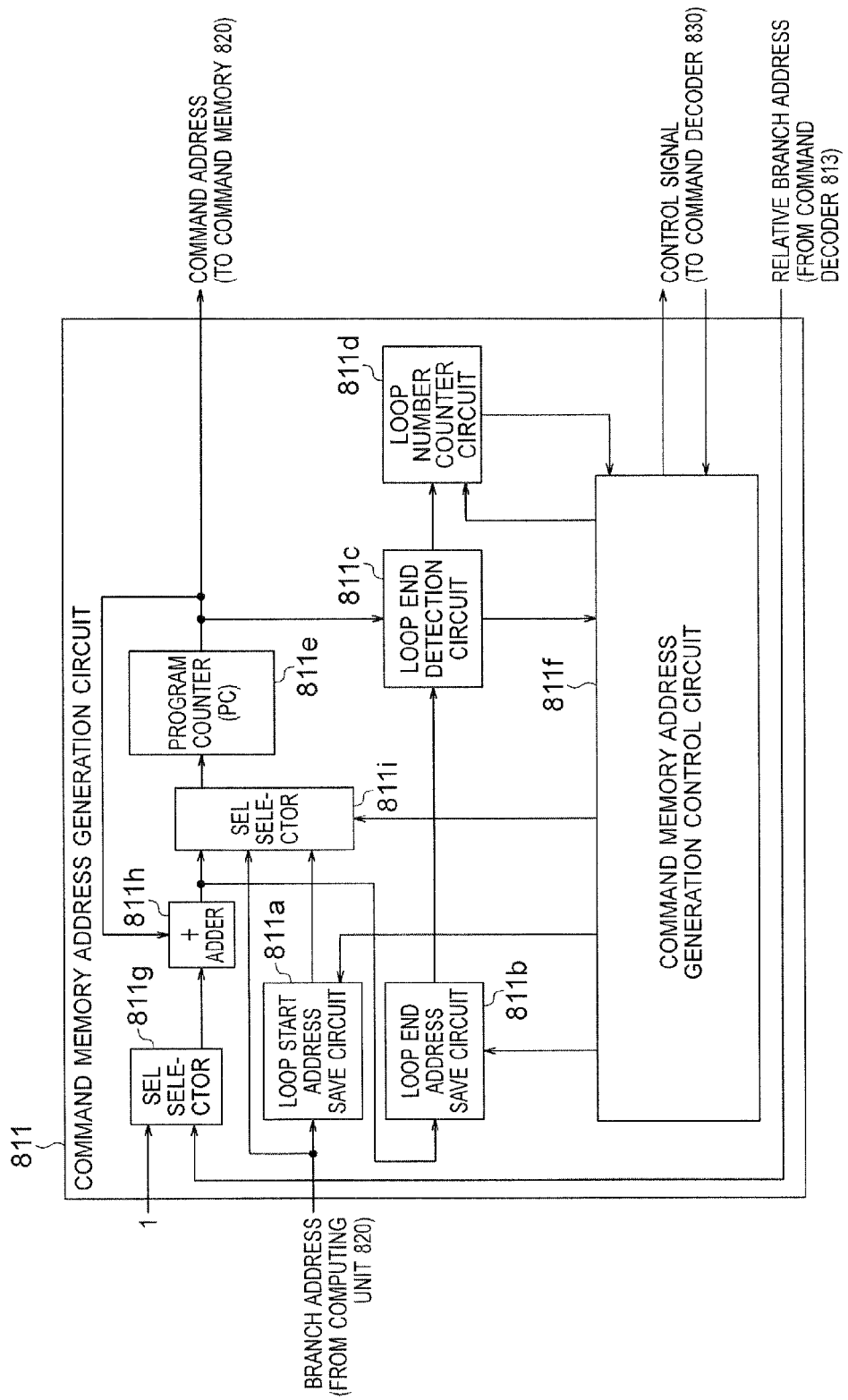
FIG. 11 is an explanatory chart showing the structure of the command memory address generation circuit when the loop processing is executed by a hardware loop in the DSP shown in FIG. 7.

The hardware added to the command memory address generation circuit 11 for performing this processing simply needs to be able to save and compare the bit widths of the branch relative addresses, so that increase in the circuit scale is smaller than the case of the hardware loop circuit shown in FIG. 11. Such devising makes it possible for the DSP 1 to suppress deterioration in the processing capacity caused due to generation of the branch penalty when executing the loop command sequence while suppressing the increase in the circuit scale to be small.

Overall Actions of Embodiments

Next, overall actions of the above embodiment will be described.

A program control method according to the embodiment is used with the digital signal processor (DSP 1) which includes: the data memory 40 which stores data to be the targets of processing; the computing unit 20 which execute calculations on the data; the register 30 which temporarily stores results of the calculations; the command memory 12 which stores in advance the command codes in which the commands to be executed by the computing unit are written; and the program control circuit 10 which generates a control signal showing an action command for the computing unit. The program counter outputs the address on the command memory to the command decoder (FIG. 5: step S202), the command decoder sequentially reads out the command codes stored at the outputted address on the command memory and outputs those to the computing unit (FIG. 5: step S203), when the command code is the loop processing in which the same command is sequentially repeated, the circuit for switching the branch command for loop processing outputs the branch relative address that shows the address on the command memory regarding the loop processing branch command showing the branch condition of the loop processing to the branch relative address save circuit (FIG. 5: step S205), the command memory address generation control circuit sets the loop state flag to the loop state save circuit when the loop processing is being executed (FIG. 5: step S206), the command code length counter circuit counts the command code length that is the code length of one-time execution of the loop processing (FIG. 5: step S207), and the program counter sum value switching circuit outputs, to the program counter, the first address of the loop processing calculated by adding the command code length and the branch relative address when the branch condition is satisfied in the loop processing branch command (FIG. 5: steps S209 to 210).

Note here that each of those operation steps may be put into a program to be executed by a computer so as to be executed by the command memory address generation control circuit 11a and the command decoder 13 which directly execute each of those steps. Further, it is possible to achieve the DSP 1 itself according to the embodiment virtually by a computer. The program may be recorded in a non-transitory recording medium such as a DVD, a CD, a flash memory, or the like. In that case, the program is read out from the recording medium and executed by the computer.

With such operations, the embodiment can provide following effects.

The loop command sequence is repeatedly executed for an extremely large number of times with the DSP 1. However, the branch penalty generated in the repeated executions can be suppressed only to two times in the first time and the last time. In the meantime, the hardware to be added simply needs to be able to save the data of the bit width of the branch relative address. Therefore, the DSP 1 of the present invention can achieve the processing almost same as the case of the hardware loop circuit which stores the head and the end of the branch address shown in FIG. 11 by suppressing the storage capacity of the register to a half thereof or less.

Further, while the number of repetitions of the loop command sequence is fixed as described above with the hardware loop circuit, it is possible with the DSP 1 of the present invention to set the branch condition according to the state of the command sequence that is being executed and to employ the different number of repetitions every time the command sequence is executed. That is, it is possible to suppress deterioration in the processing capacity also in terms of the fact that the command sequence does not need to be executed more than the required repetition times.

While the present invention has been described above by referring to the specific embodiments shown in the drawings, the present invention is not limited only to the embodiments described above. Any other known structures can be employed, as long as the effects of the present invention can be achieved therewith.

Regarding the embodiments described above, the new technical contents thereof can be summarized as follows. While a part of or a whole part of the embodiments can be summarized as follows as the new techniques, it is to be noted that the present invention is not necessarily limited only to the followings.

(Supplementary Note 1)

A digital signal processor which includes: a data memory which stores data as targets for executing processing; a computing unit which executes calculations on the data; a register which temporarily stores results of the calculations; and a program control circuit which generates a control signal that shows an action command for the computing unit, wherein:

the program control circuit includes a command memory which stores command codes in which commands to be executed by the computing unit are written, a command decoder which sequentially reads out the command codes stored in the command memory and outputs those to the computing unit; and a command memory address generation circuit which generates a command memory address at which a command to be read out from the command memory is stored;

the command decoder includes a circuit for switching branch command for loop processing, which outputs a branch relative address that shows an address of a loop processing branch command showing a branch condition of the loop processing on the command memory when the command codes are the loop processing in which a same command is sequentially repeated; and the command memory address generation circuit includes a program counter which outputs addresses on the command memory to the command decoder, a loop state save circuit which saves a loop state flag showing that the loop processing is being executed, a command memory address generation control circuit which sets the loop state flag to the loop state save circuit when the loop processing is being executed, a branch relative address save circuit which saves the branch relative address, a command code length counter circuit which counts a command code length that is a code length of one-time execution of the loop processing, and a program counter sum value switching circuit which outputs, to the program counter, a head address of the loop processing calculated by adding the command code length and the branch relative address when the branch condition is satisfied in the loop processing branch command.

(Supplementary Note 2)

The digital signal processor as depicted in Supplementary Note 1, wherein the command decoder includes a loop state removal circuit which removes the loop state flag of the loop state save circuit when the branch condition is satisfied in the loop processing branch command.

(Supplementary Note 3)

The digital signal processor as depicted in Supplementary Note 1, wherein the command code length counter circuit includes:

a loop command sequence counter register which stores a numerical value in a period where the loop state flag is being set;

a subtractor which subtracts the numerical value stored in the loop command sequence counter register by 1; and a comparator which compares absolute values of numerical values stored in the loop command sequence counter register and the branch relative address save circuit and, when both match with each other, outputs a signal indicating that it has reached an end address of the loop processing to the command memory address generation control circuit.

(Supplementary Note 4)

The digital signal processor as depicted in Supplementary Note 1, wherein a range of the branch relative addresses saved in the branch relative address save circuit is limited to be equal to or less than an address bus width of the command memory.

(Supplementary Note 5)

A program control method used in a digital signal processor which includes: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit, wherein:

a program counter outputs addresses on the command memory to the command decoder, a command decoder sequentially reads out the command codes stored at the outputted addresses on the command memory and outputs those to the computing unit;

a circuit for switching branch command for loop processing outputs, to a branch relative address generation circuit, a branch relative address that shows an address of a loop processing branch command showing a branch condition of the loop processing on the command memory when the command codes are the loop processing in which a same command is sequentially repeated;

a command memory address generation control circuit sets the loop state flag to the loop state save circuit when the loop processing is being executed;

a command code length counter circuit counts a command code length that is a code length of one-time execution of the loop processing; and a program counter sum value switching circuit outputs, to the program counter, a head address of the loop processing calculated by adding the command code length and the branch relative address when the branch condition is satisfied in the loop processing branch command.

(Supplementary Note 6)

A control program used in a digital signal processor which includes: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit, the program causing a computer that controls the digital signal processor to execute:

a procedure for outputting addresses on the command memory to the command decoder, a procedure for sequentially reading out the command codes stored at the outputted addresses on the command memory and outputting those to the computing unit;

a procedure for outputting a branch relative address that shows an address of a loop processing branch command showing a branch condition of the loop processing on the command memory when the command codes are the loop processing in which a same command is sequentially repeated;

a procedure for setting the loop state flag when the loop processing is being executed;

a procedure for counting a command code length that is a code length of one-time execution of the loop processing; and a procedure for outputting a head address of the loop processing calculated by adding the command code length and the branch relative address when the branch condition is satisfied in the loop processing branch command.

This application claims the Priority right based on Japanese Patent Application No. 2011-245769 filed on Nov. 9, 2011 and the disclosure thereof is hereby incorporated by reference in its entirety.

INDUSTRIAL APPLICABILITY

The present invention can be applied to general processors which execute computer programs. Especially, however, the present invention is suited for DSP, more specifically DSP loaded on signal processing LSI used in mobile phone terminals, AV (audio/video) equipment, and the like.

REFERENCE NUMERALS

1 DSP
10 Program control circuit
11 Command memory address generation circuit
11a Command memory address generation control circuit
11b Program counter adder
11c Program counter input selector
11d Program counter
11e Branch relative address save circuit
11f Command code length counter circuit
11g Program counter sum value switching circuit
11h Loop state save circuit
11i Loop command sequence counter register
11j Subtractor
11k Selector
11l Comparator
11m Selector
11n Loop state flag
12 Command memory
13 Command decoder
13a Loop processing branch command switching circuit
13b Loop state removal circuit
20 Computing unit
30 Register
40 Data memory
100 Command sequence
100a to p Command

The invention claimed is:

1. A digital signal processor, comprising: a data memory which stores data as targets for executing processing; a computing unit which executes calculations on the data; a register which temporarily stores results of the calculations; and a program control circuit which generates a control signal that shows an action command for the computing unit, wherein:

the program control circuit comprises a command memory which stores command codes in which commands to be executed by the computing unit are written, a command decoder which sequentially reads out the command codes stored in the command memory and outputs those to the computing unit, and a command memory address generation circuit which generates a command memory address at which a command to be read out from the command memory is stored;

the command decoder comprises a circuit for switching branch command for loop processing, which outputs a branch relative address that shows a relative position between an address of a loop processing branch command showing a branch condition of the loop processing and a branch destination address when the command codes are the loop processing in which a same command is sequentially repeated; and the command memory address generation circuit comprises:

a program counter which outputs addresses on the command memory to the command decoder;

a loop state save circuit which saves a loop state flag showing that the loop processing is being executed;

a command memory address generation control circuit which sets the loop state flag to the loop state save circuit when the loop processing is being executed;

a branch relative address save circuit which saves the branch relative address;

a command code length counter circuit which counts a command code length that is a code length of one-time execution of the loop processing; and a program counter sum value switching circuit which outputs, to the program counter, a head address of the loop processing calculated by adding the command code length and the branch relative address when the loop state flag is set and the command code length counter circuit detects a last address of the loop processing, wherein the command detector includes a loop state removal circuit which releases the loop state flag of the loop state save circuit when the branch condition is not satisfied in the loop processing branch command or when the branch condition is satisfied in other branch command.

2. The digital signal processor as claimed in claim 1, wherein the command code length counter circuit comprises:

a loop command sequence counter register which stores a numerical value in a period where the loop state flag is being set;

a subtractor which subtracts the numerical value stored in the loop command sequence counter register by 1; and a comparator which compares absolute values of numerical values stored in the loop command sequence counter register and the branch relative address save circuit and, when both match with each other, outputs a signal indicating that it has reached an end address of the loop processing to the command memory address generation control circuit.

3. The digital signal processor as claimed in claim 1, wherein a range of the branch relative addresses saved in the branch relative address save circuit is limited to be equal to or less than an address bus width of the command memory.

4. A program control method used in a digital signal processor which comprises: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit, wherein:

a program counter outputs addresses on the command memory to the command decoder;

a command decoder sequentially reads out the command codes stored at the outputted addresses on the command memory and outputs those to the computing unit;

a circuit for switching branch command for loop processing outputs, to a branch relative address generation circuit, a branch relative address that shows a relative position between an address of a loop processing branch command showing a branch condition of the loop processing and a branch destination address when the command codes are the loop processing in which a same command is sequentially repeated;

a command memory address generation control circuit sets the loop state flag to the loop state save circuit when the loop processing is being executed;

a command code length counter circuit counts a command code length that is a code length of one-time execution of the loop processing; and a program counter sum value switching circuit which outputs, to the program counter, a head address of the loop processing calculated by adding the command code length and the branch relative address when the loop state flag is set and the command code length counter circuit detects a last address of the loop processing, wherein a loop state removal circuit of the command detector releases the loop state flag of the loop state save circuit when the branch condition is not satisfied in the loop processing branch command or when the branch condition is satisfied in other branch command.

5. A non-transitory computer readable recording medium storing a control program used in a digital signal processor which comprises: a data memory which stores data as targets for executing processing; a computing unit which executes calculations on the data; a register which temporarily stores results of the calculations; a command memory which stores in advance command codes in which commands to be executed by the computing unit are written; and a program control circuit which generates a control signal that shows an action command for the computing unit, the program causing a computer that controls the digital signal processor to execute:

a procedure for outputting addresses on the command memory to the command decoder;

a procedure for sequentially reading out the command codes stored at the read out addresses on the command memory and outputting those to the computing unit;

a procedure for outputting a branch relative address that shows that shows a relative position between an address of a loop processing branch command showing a branch condition of the loop processing and a branch destination address when the command codes are the loop processing in which a same command is sequentially repeated;

a procedure for setting the loop state flag to the loop state save circuit when the loop processing is being executed;

a procedure for counting a command code length that is a code length of one-time execution of the loop processing; and a procedure for outputting a head address of the loop processing calculated by adding the command code length and the branch relative address when the loop state flag is set and the command code length counter circuit detects a last address of the loop processing, and a procedure for releasing the loop state flag of the loop state save circuit when the branch condition is not satisfied in the loop processing branch command or when the branch condition is satisfied in the other branch command.

6. A digital signal processor, comprising: a data memory which stores data as targets for executing processing; a computing unit which executes calculations on the data; a register which temporarily stores results of the calculations; and program control means for generating a control signal that shows an action command for the computing unit, wherein:

the program control means comprises a command memory which stores command codes in which commands to be executed by the computing unit are written, a command decoder which sequentially reads out the command codes stored in the command memory and outputs those to the computing unit, and command memory address generation means for generating a command memory address at which a command to be read out from the command memory is stored;

the command decoder comprises means for switching branch command for loop processing, which outputs a branch relative address that shows a relative position between an address of a loop processing branch command showing a branch condition of the loop processing and a branch destination address when the command codes are the loop processing in which a same command is sequentially repeated; and the command memory address generation circuit comprises a program counter which outputs addresses on the command memory to the command decoder, loop state save means for saving a loop state flag showing that the loop processing is being executed, command memory address generation control means for setting the loop state flag to the loop state save means when the loop processing is being executed, branch relative address save means for saving the branch relative address, command code length counter means for counting a command code length that is a code length of one-time execution of the loop processing, and program counter sum value switching means for outputting, to the program counter, a head address of the loop processing calculated by adding the command code length and the branch relative address when the loop state flag is set and the command code length counter means detects a last address of the loop processing, wherein the command detector includes loop state removal means for releasing the loop state flag of the loop state save means when the branch condition is not satisfied in the loop processing branch command or when the branch condition is satisfied in other branch command.

* * * * *